(12) United States Patent
Fargano et al.

(10) Patent No.: US 6,456,696 B1
(45) Date of Patent: Sep. 24, 2002

(54) METHOD AND APPARATUS FOR TEMPORARILY DEACTIVATING A CALL INDICATOR

(75) Inventors: Michael J. Fargano, Louisville; Richard P. Fehl, Lafayette, both of CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/054,352

(22) Filed: Apr. 2, 1998

Related U.S. Application Data

(63) Continuation-in-part of application No. 09/001,338, filed on Dec. 31, 1997.

(51) Int. Cl.⁷ .............................. H04M 1/64; H04M 3/42
(52) U.S. Cl. ................... 379/70; 379/88.11; 379/88.19; 379/201.01; 379/201.07; 379/211.01
(58) Field of Search .......................... 379/67.1, 70, 74, 379/82, 88.08, 88.11, 88.12, 88.15, 88.19, 88.22, 88.23, 88.24, 210, 211, 212, 210.01, 201.01, 201.07, 207.03, 207.12, 208.01, 209.01, 211.01, 212.01; 455/406, 410, 414, 415, 564, 567, 575

(56) References Cited

U.S. PATENT DOCUMENTS

| | | | | |
|---|---|---|---|---|
| 4,481,382 A | * | 11/1984 | Villa-Real | 455/556 |
| 4,851,820 A | * | 7/1989 | Fernandez | 340/825 |
| 4,982,424 A | * | 1/1991 | Saito et al. | 379/376 |
| 5,265,145 A | * | 11/1993 | Lim | 379/88 |
| 5,363,425 A | * | 11/1994 | Mufti et al. | 379/38 |
| 5,471,519 A | * | 11/1995 | Howe et al. | 379/67.1 |
| 5,559,860 A | * | 9/1996 | Mizikovsky | 379/58 |
| 5,604,791 A | * | 2/1997 | Lee | 379/67 |
| 5,742,905 A | * | 4/1998 | Pepe et al. | 455/461 |
| 5,754,627 A | * | 5/1998 | Butler et al. | 455/414 |
| 5,767,778 A | * | 6/1998 | Stone et al. | 340/636 |
| 6,018,671 A | * | 1/2000 | Bremer | 455/567 |
| 6,021,181 A | * | 2/2000 | Miner et al. | 379/88.23 |
| 6,216,016 B1 | * | 4/2001 | Cronin | 455/567 |
| 6,252,516 B1 | * | 6/2001 | Mottier et al. | 340/825.44 |

* cited by examiner

Primary Examiner—Allan Hoosain
(74) Attorney, Agent, or Firm—Marsh Fischmann & Breyfogle LLP

(57) ABSTRACT

A call indicator, such as a ringer, is deactivated on a temporary or preset basis while normal call processing continues, so that the subscriber can attain an appropriate level of privacy for answering a phone call. In one embodiment, a handset (10) includes an antenna (12) for receiving an incoming call signal, a processor (16) for processing the call signal, a call indicator (48) for notifying the user of the incoming call, a keypad (38) for providing user inputs, and call indicator control subsystem (32). The control subsystem (32) receives a temporary deactivation input via keypad (38) or a menu and, in response to the temporary deactivation input, deactivates the call indicator (48) for a portion of a answer waiting time period between receipt of the incoming call signal and a call answer input. For example, if the handset (10) "rings" during a business meeting, the subscriber may provide a first input via the keypad (38), menu or other input method to deactivate the call indicator. Once the subscriber has left the meeting room or otherwise attained an appropriate level of privacy, the subscriber may provide a second input via the keypad (38) or a menu to answer the call. Optionally, the handset (10) may be preset (e.g., before entering a meeting) to provide only an abbreviated indication such as a "ping ring" if a call is received. In addition, a voice announcement may be provided, during the time period where the subscriber is seeking privacy, to notify the caller that the call will be answered shortly. Alternatively, the subscriber may allow a call to be forwarded to voice mail if an appropriate level of privacy cannot be attained in a timely manner.

17 Claims, 3 Drawing Sheets

METHOD AND APPARATUS FOR TEMPORARILY DEACTIVATING A CALL INDICATOR

RELATED APPLICATIONS

This application is a Continuation-In-Part application of U.S. patent application Ser. No. 09/001,338, filed Dec. 31, 1997, entitled "METHOD AND APPARATUS FOR TEMPORARILY DEACTIVATING A CALL INDICATOR " now abandoned.

FIELD OF THE INVENTION

The present invention relates in general to improved subscriber systems for cellular or wireless telephones, wireline customer premise equipment (CPE) and other communications equipment. In particular, the present invention relates to a method and apparatus for deactivating an incoming call indicator, e.g., a vibrator, ringer or other indicator, on a per call or temporary basis. The invention is particularly useful in the context of portable telephones which may be carried into social gatherings, business meetings and other events where it is desirable to minimize disruption to others.

BACKGROUND OF THE INVENTION

One of the great attractions of portable telephones, especially compact cellular or wireless phones, is that they can be conveniently carried by a subscriber, thereby allowing the subscriber to be contacted as needed. The subscriber, therefore, need not "stay by the phone" when an important call is anticipated but, rather, is free to attend meetings or social events, conduct business or otherwise proceed normally with his day.

Unfortunately, there are certain situations where receiving an incoming call may be disruptive and inappropriate. Conventionally, when a portable (or other) telephone receives an incoming call signal, a call indicator system such as a ringer system is activated to notify the subscriber of the incoming call. Typically, the phone is programmed to ring, repeatedly, until either the phone is answered or a given time period elapses, at which point a hang up or other caller unavailable signal is provided. A subscriber receiving a call during certain meetings, social occasions or other events, is therefore placed in the uncomfortable position of having to allow the phone to continue ringing at the risk of disrupting his current company, answer the phone and request time to attain an appropriate level of privacy before continuing the conversation at the risk of offending the caller and current company, or silence the ringer by hanging up, thereby offending the caller and, to a great extent, forfeiting one advantage of having a portable phone.

The problem of inappropriate phone ringing has now reached a level where some restaurants and other establishments have adopted rules against phone use on the premises, and a significant segment of the public is coming to view portable phone users as ill-mannered and inconsiderate. Unsurprisingly, the problem is a matter of great concern to phone equipment manufacturers, carriers and other service providers.

SUMMARY OF THE INVENTION

The present invention allows a subscriber to temporarily deactivate the telephone ringer, or other call indicator, until the subscriber can attain an appropriate level of privacy. The call indicator is deactivated without terminating processing of the incoming call. In this manner, the subscriber is notified of the incoming call with minimal disruption and annoyance of current company. Moreover, call processing continues while the subscriber seeks privacy for answering the call such that inconvenience to the caller is minimized.

According to one aspect of the present invention, a system is provided for temporarily deactivating a call indicator, i.e., a ringer, vibrator, or other device for notifying the subscriber of an incoming call. The system involves a called telephone including a receiver for receiving an incoming call signal from a calling telephone, a call indicator for notifying the subscriber of the incoming call signal and an answering input device for providing an answering signal in response to an input by the subscriber, e.g., a call pickup signal. The call indicator is normally active during an answering time period between receipt of the incoming call signal and receipt of the answering signal. For example, in the case of a ringer, the ringer may ring periodically throughout the answering time period. The called telephone also includes an incoming call processor for receiving the incoming call signal and processing a call request during the answering time period. Among other things, the call processor may signal switching devices of the telecommunications network to set up the call and activate a timer for terminating the call request if the request is not answered within a predetermined time.

The novel system includes a call indicator controller for deactivating the call indicator during at least a portion of the answering time period while processing of the call request continues normally. The call indicator controller includes a device for receiving a deactivation input from the subscriber and a device for controlling operation of the call indicator in response to the deactivation input so as to temporarily deactivate operation of the call indicator. The deactivation input may be entered by the subscriber via a keypad, menu or other input method (e.g., voice) of the called telephone. For example, a particular key of the keypad may be designated for receiving the deactivation input. In this manner, the subscriber can deactivate the call indicator by pressing or clicking the designated key and then subsequently answer the incoming call by clicking any key of the keypad or a second key designated for answering. Alternatively, the deactivation input may be entered by the subscriber by clicking any key (as opposed to a designated key) of the keypad. The subscriber may subsequently, or immediately, answer the call by clicking any key of the keypad or a key designated for answering. In the case where any key can be used to enter the deactivation input and any key can be used to answer, the user can immediately answer the phone by double clicking on any key of the keypad.

The call indicator deactivation system of the present invention can be implemented in conjunction with any suitable architecture including handset and/or network components. In this regard, the associated logic can be wholly or partially programed into the hardware of a portable telephone or the logic can be resident elsewhere in the telecommunication system. In the latter case, for example, a call indicator deactivation input by the subscriber may be transmitted from the called telephone to a switch, an associated register or other processor of the network. In response, the network may transmit a signal to the called telephone which causes the telephone to deactivate the call indicator without terminating call processing. It will be appreciated that other architectures for implementing the present invention are possible, e.g., a smart card based CPE for storing data and executing logic programs.

According to another aspect of the present invention, a telephone can be preset to minimize disruption of social gatherings, business meetings or other events due to incoming calls. A call indicator of a called telephone is associated with a controller for selectively operating the call indicator based on inputs from the subscriber. For example, a first user input can implement a pre-programmed operation for substituting a single ping ring for the familiar periodic ringing function. A second input can restore the normal ringer function. The controller receives the subscriber inputs, stores information regarding the selected operation (e.g., ping ring or normal ringing), and subsequently operates the call indicator in accordance with the selected function upon receiving an incoming call signal. In this manner, the subscriber can preset the telephone to provide a minimized call indication when the subscriber anticipates that he/she will be in settings where normal indicator operation would be disruptive.

In accordance with another aspect of the present invention, a holding announcement is provided in conjunction with deactivation of a call indicator using network and/or CPE equipment. The associated system includes a memory for storing a holding message such as "please hold, your call will be answered shortly" and a processor for receiving an incoming call signal, establishing communication between the called telephone and the calling telephone and recalling and playing the stored holding message. The processor is preferably further operative for receiving an answering input from the subscriber and interrupting the holding message upon receipt of the answering signal so as to permit normal communication as between the called and calling telephone. The system may further monitor the telephone to determine whether the subscriber answers within a predetermined time. If no answer is received within the predetermined time, a further announcement may be provided or the call may be forwarded to network voice mail. An indicator light, warning message or other indication can be provided so that the subscriber knows when the predetermined time is close to elapsing. In addition, a suitable mechanism may be provided to allow the subscriber to select, re-start or extend the predetermined time.

The invention may be understood as encompassing certain operating "modes" and a number of "implementations" for selecting operation in these modes. The operating modes relate to whether the telephone's incoming call indicator (e.g., the ringer) is allowed to operate normally or is operated to minimize disruption. In this regard, the invention allows a subscriber to select between: 1) an active indicator mode, and 2) a temporarily deactivated mode. In the active indicator mode, the call indicator is active throughout the answer waiting time period, i.e., until the call is answered or the time for answering expires. In the temporarily deactivated mode, the call indicator is deactivated during at least a portion of the answering time period. For example, in the temporarily deactivated mode, the call indicator may provide a single ring, abbreviated ring, or other indication and then remain inactive for the remainder of the call answering time period. A number of possible "implementations" of this mode selection function are possible. Generally, these implementations include: 1) a subsystem for allowing the subscriber to pre-select the temporarily deactivated mode prior to receiving a call, e.g., before entering a meeting; 2) a subsystem for deactivating the call indicator after a call has been received (e.g., while the phone is ringing) by pressing a designated key; 3) a subsystem for deactivating the call indicator after a call has been received by pressing any key on the keypad; and 4) a subsystem for providing a recorded message while the indicator is deactivated and the caller is waiting for the called phone to be answered.

The present invention thus allows a subscriber to deactivate the telephone ringer until the subscriber can attain an appropriate level of privacy, thereby reducing :disruption and annoyance of others. The invention also allows processing of the incoming call to continue upon deactivation of the call indicator so that inconvenience to the caller is minimized.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION OF THE INVENTION

In the following description, the invention is set forth in the context of a wireless telephone network such as various cellular and PCS networks. It will be appreciated that the invention has particular advantages in connection with such a telephone network as subscribers in such networks often have occasion to bring telephones into social gatherings, business meetings or other events where an incoming telephone call may be disruptive. However, various aspects of the invention are equally applicable to cordless telephones, wireline telephone systems and other communications equipment. That is, the invention may advantageously be employed in any context where it may desirable to temporarily deactivate a ringer or other call indicator.

Figure 1:
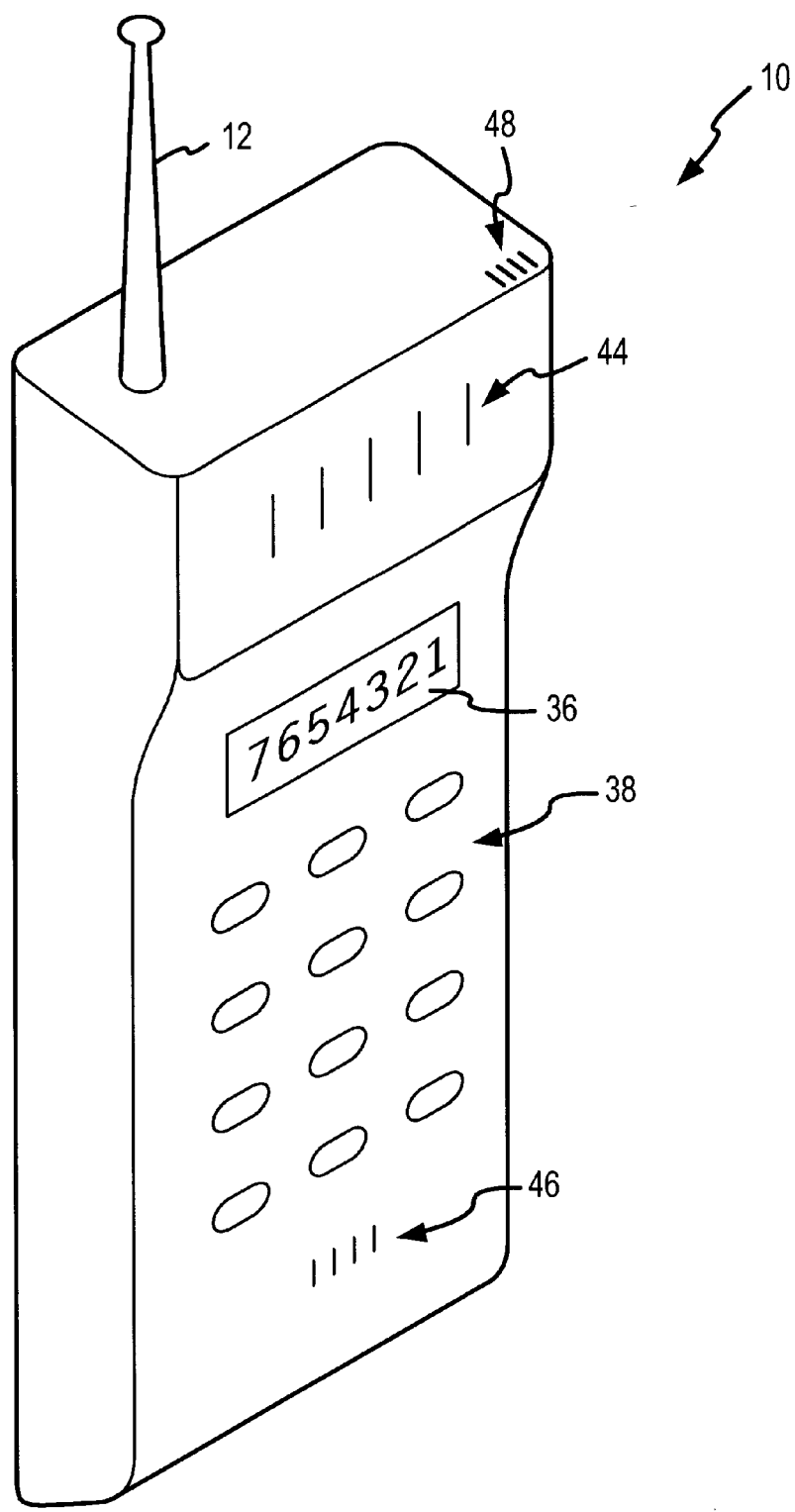
FIG. 1 is a perspective view of a portable telephone in connection with which the present invention can be used.
Figure 2:
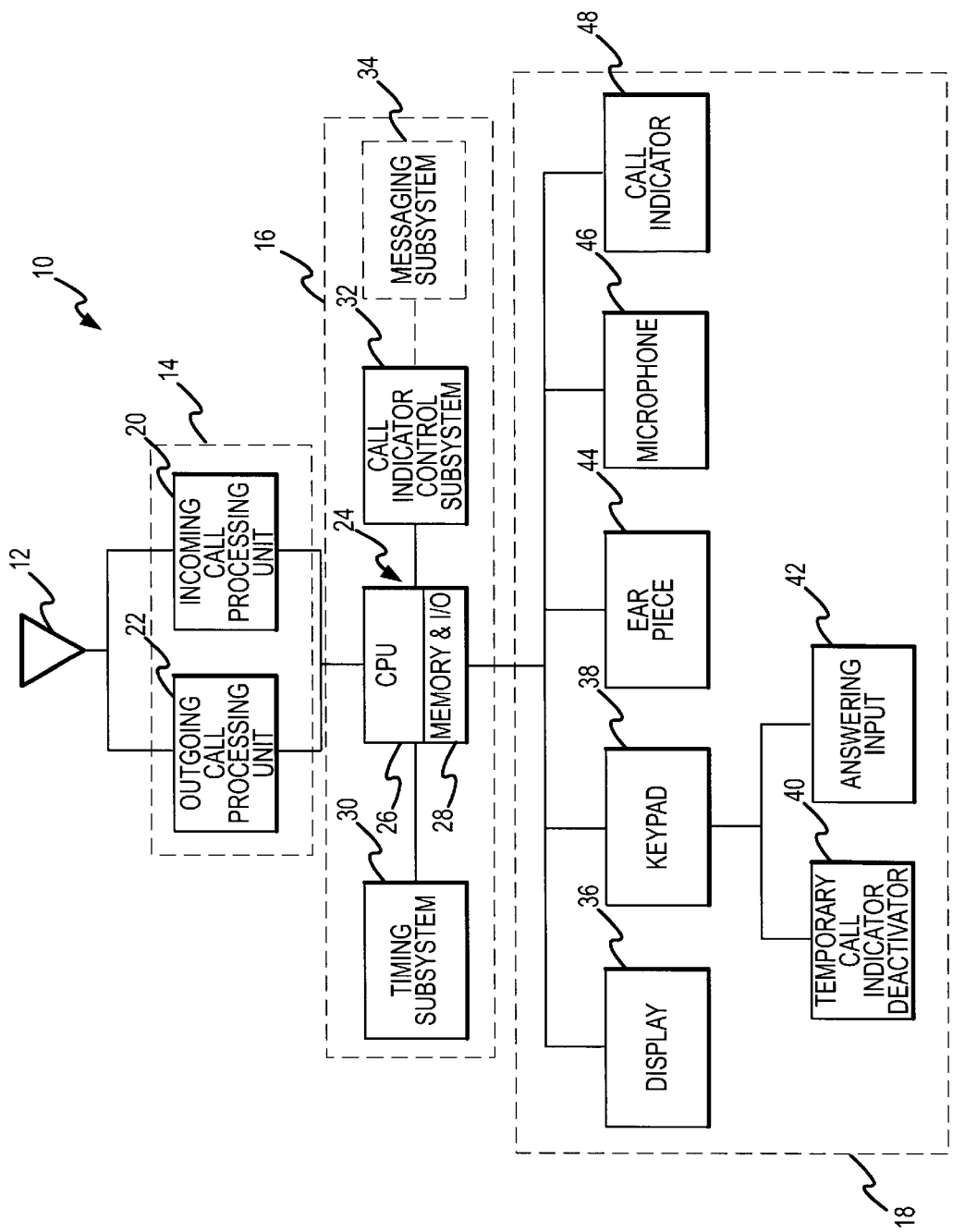
FIG. 2 is a schematic diagram of a portable telephone system in accordance with the present invention.

Referring to FIGS. 1 and 2, a cordless handset system 10 is illustrated. Generally, the handset 10 includes: an antenna 12 for receiving/transmitting RF signals as between the handset 10 and a cell site antenna of a wireless/cellular telecommunications network; receiving/transmitting components 14 associated with the antenna 12 for processing incoming and outgoing signals, call processing components 16 for controlling operation of the handset 10, and user interface components 18 for providing an interface between the handset 10 and the subscriber.

The receiving/transmitting components 14 include an incoming signal processing unit 20 and an outgoing call processing unit 22. The incoming signal processing unit 20 performs a number of functions relative to an incoming call signal including: filtering the incoming signal to remove unnecessary wavelength bands, demodulating the high frequency carrier signal and converting the signal into a digital format for processing by the call processing component 16. The outgoing call processing unit 22 performs a number of functions relative to transmitting a signal including processing a voice or other signal for transmission, synthesizing the communication signal to apply a reference frequency, modulating the communication signal into a high frequency carrier signal and filtering the resulting signal for transmission.

The call processing components 16 includes a processor 24 including a CPU 26 and a memory and I/O unit 28, a timing subsystem 30, a call indicator control subsystem 32 and an optional messaging subsystem 34. Operation of the timing system 30, control system 32 and messaging system 34 will be described in more detail below. The processor 24 controls operation of the various components of the handset 10. In this regard, the processor 24 receives an incoming signal from the incoming signal processing unit 14, and notifies the subscriber of the incoming call. The processor 24 also communicates with cell site/switch equipment via the outgoing call processing unit 16 and antenna 12 to establish a channel for communication as between the handset 10 and a calling telephone that originated the incoming call signal. With respect to outgoing calls, the processor 24 receives information from the user interface components 18, e.g., a phone number and transmit signal, communicates with cell site/switch equipment via the outgoing call processing unit 22 and antenna 12 to establish a communications channel, transmits a call request and waits for a response from the called telephone/network. During a phone conversation, the processor 24 receives voice communications from the user interface components 18, transmits the voice communications, receives incoming signals, transmits voice communications to the user interface components 18, and detects any operating signals such as a hang up signal.

The user interface components 18 include a number of devices for communicating with the subscriber. The display 36, provides a visual presentation of a phone number entered by the user, information regarding an incoming call and/or various operating information such as status of the handset's battery. The keypad 38 may include buttons corresponding to the numbers 0–9 for entering phone numbers or other numerical information as well as various other buttons such as "end", "off", "#", "*", "flash", "send", or other buttons. As described below, in accordance with the present invention, the keypad 38 may include one or more buttons that function as a temporary ringer silencer or temporary call indicator deactivation input key 40 and an answering input key 42. The ear piece 44, receives communication information from the processor 24 and provides audio signals to the subscriber. Microphone 46 receives voice or other audio signals from the subscriber and provides corresponding communication signals to the processor 24. Finally, the call indicator 48 provides a signal to the subscriber that notifies the subscriber of an incoming call. For example, the call indicator 48 may be a ringer or other device for providing an audio indication, a vibrator, or any other device which provides a signal that is perceptible by the subscriber.

The call indicator 48, the keypad 38 including the temporary ringer silencer input key 40 and answering input key 42, the timing subsystem 30, processor 24, control subsystem 32 and optional messaging subsystem 34 are of particular significance with respect to understanding the temporary call indicator deactivation system of the present invention. In the active indicator mode, upon receiving an incoming call signal, the processor 24 in cooperation with the control subsystem 32 activates the call indicator 48 to notify the subscriber of the incoming call. The call indicator 48 is activated throughout the time period between receipt of the incoming call signal and receipt of an answering input signal from the keypad 38. In the case of a ringer, the ringer will sound periodically throughout this answering time period. If an answering input 42 is not received within a given time, as measured by reference to the timing subsystem 30, the processor 24 may transmit a hang up or other signal by which the calling telephone is notified that the subscriber is unavailable. In the temporarily deactivated mode of operation, the processor 24 in cooperation with the control subsystem 32 controls the call indicator 48 upon receipt of an incoming call signal such that the call indicator is inactive for a portion of the call answer waiting period. This mode of operation is controlled in response to the deactivation input key 40 and the answering input key 42.

In one optional implementation, the "designated key implementation", a particular key of the keypad 38 or menu entry is designated as the temporary deactivation input key 40. Upon receiving an input from the deactivation input key 40, the processor 24 switches operation of the call indicator 48 from the active indicator mode of operation, as described above, to the temporarily inactive mode of operation where the indicator 48 is deactivated for a portion of the answering time period. For example, if the handset's ringer sounds when the subscriber is at a social gathering or in a business meeting, the subscriber can select the deactivation key so as to silence the ringer. Although the ringer is silenced, the processor 24 will continue processing of the incoming call.

In conjunction with this designated key implementation of the invention, the answering input key 42 may be provided by way of a particular answering key/menu entry or by pressing any of the keys of keypad 38. Preferably, the answering input 42 is provided by selecting a key other than the designated temporary deactivation input key. Thus, the subscriber can answer a call immediately by simply selecting a non-designated key. Alternatively, the subscriber can temporarily deactivate the ringer by selecting the designated key and then answer, when an appropriate degree of privacy is attained, by selecting a non-designated key.

In another implementation, the "any key implementation," the deactivation input is provided by clicking on any key of the keypad 38. Subsequently, the subscriber clicks any key of the keypad 38 to answer. In order to answer a call immediately, the subscriber double clicks on any key of the keypad 38.

In a further implementation, the "preset implementation," the subscriber may select, e.g., by a keystroke or menu entry, the deactivation input key 40 prior to receipt of an incoming call to preset the handset 10 for temporarily inactive mode operation. In this regard, the processor 24 may control the handset's ringer to provide a single ring or an abbreviated "ping" ring, after which the ringer will remain silent until the call is answered or the time for answering expires.

In yet another implementation, the "messaging system implementation," the optional messaging system 34 is used to provide a holding message during the answering time period. As noted above, in temporarily inactive mode operation, the call indicator 48 is deactivated for a portion of the answering time period. This portion may be, for example, the time between when the subscriber clicks the deactivation input key 40 and when the subscriber subsequently clicks the answering input key 42. Alternatively, this period may be the time between when the preset ringer processing subsystem 32 provides an initial indication of the incoming call (e.g., a "ping ring") and when the subscriber enters the answering input 42. In either case, a holding message may be transmitted to the caller during this portion of the answer waiting period. In this regard, the processor 24 may be programmed to prompt the subscriber to enter such a holding message upon first activation of the handset 10 or at any time thereafter. In response to the prompt, the subscriber can enter a desired holding message such as "please hold, your call will be answered shortly" by speaking into the handset microphone 46. The processor receives this message and stores the message in memory 28. In temporarily inactive mode operation, the processor 24 in cooperation with the messaging subsystem 34 retrieves this message from memory 28 and transmits the message during the answer waiting period to the caller via the outgoing processing unit 22 and antenna 12. The processor 24 can be used in conjunction with the timing subsystem 30 to repeat the message, or play a further message, if the call is not answered within a selected time (e.g., within 30 seconds). In addition, the call may be forwarded to network voice mail system if the call is not answered within a given time. A suitable indication, e.g., a light, warning or other display, may be provided so that the subscriber knows when the given time is about to elapse. It will be appreciated that the various implementations as thus described are not exclusive, but rather, certain combinations of the implementations are possible.

Although the illustrated embodiment employs an architecture wherein the various functional elements of the call indicator deactivation system are incorporated into the hardware of the handset 10, it will be appreciated that certain functional components may be executed external to the handset, e.g., by a switch processor or other processor of the telecommunications network. For example, the timing system, control subsystem 32, and messaging subsystem 34, may be embodied in whole or in part outside of the handset 10.

Figure 3:
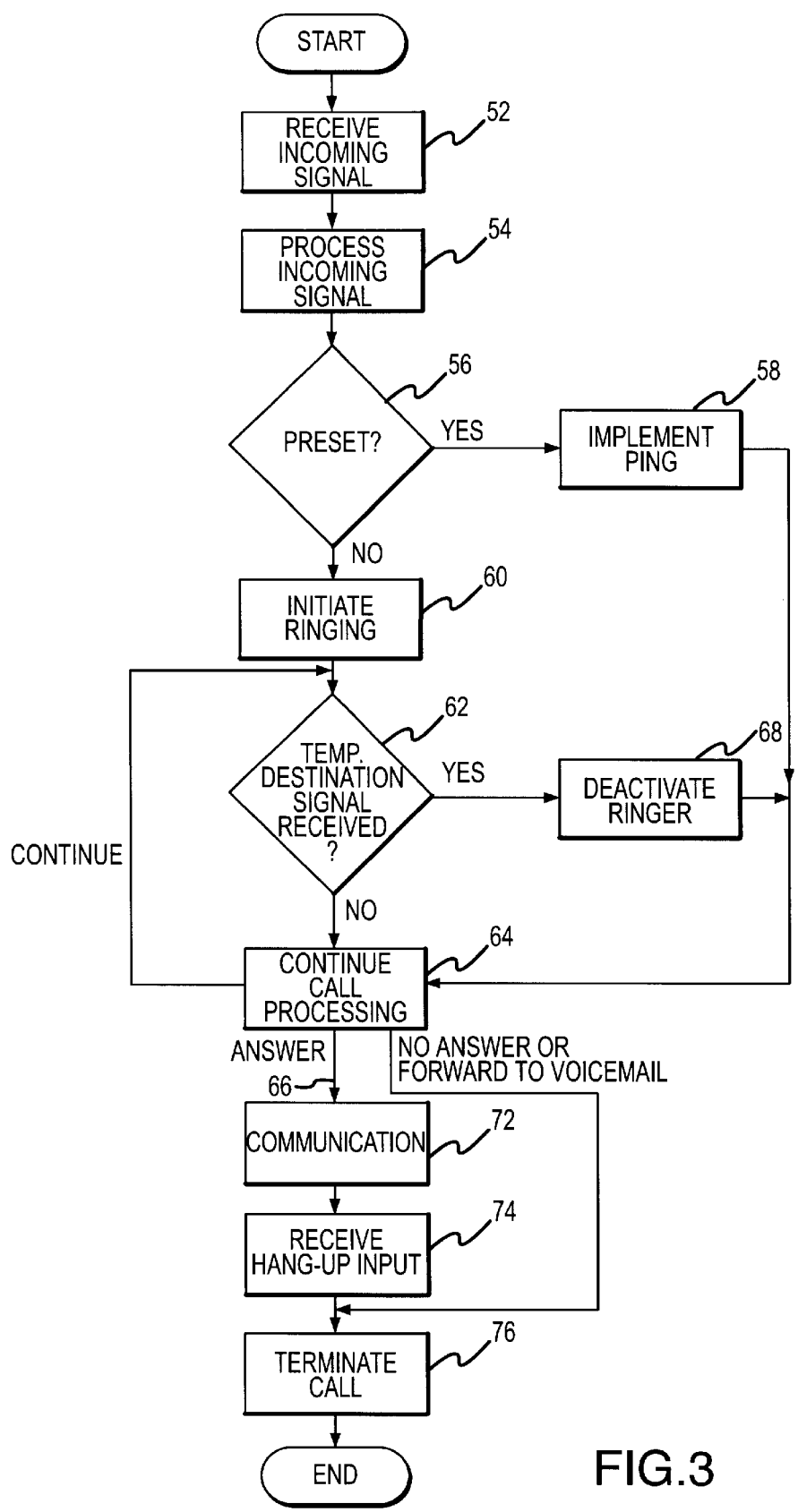
FIG. 3 is a flow chart showing a call indicator deactivation process in accordance with the present invention.

FIG. 3 is a flow chart illustrating a call indicator deactivation process in accordance with the present invention. The illustrated process is initiated by receiving (52) an incoming call signal and processing (54) the signal which includes a call request. Upon receiving the call request, the processor of a handset according to the present invention determines whether the handset has been preset (56) for temporarily inactive mode operation, i.e., whether the subscriber desires deactivation of the call indicator for a portion of the answering time period. If the handset has been preset, the ringer processing system implements (58) a "ping" ring or other abbreviated call indication and continues (64) call processing as normal. If the handset has not been preset for second mode operation, processing continues normally by initiating (60) operation of the call indicator. For example, the call indicator may be activated continuously or periodically throughout the call answer waiting period or until expiration of a given time without receiving an answering signal. During such active mode operation, the call indicator processing system monitors inputs from the handset's keypad (or menu) to detect any indication that the subscriber desires deactivation (62) of the call indicator. For example, the user may provide such an indication by clicking on a designated or other deactivation input key. If a deactivation input is provided call processing continues (64) as normal but the call indicator is deactivated (68).

If no deactivation input is provided, call processing continues (64) as normal until an answering signal such as an off-hook signal is provided (66), or a predetermined time expires without receiving an answering signal. When a deactivation input is entered during the answer waiting period, further processing depends on the specific implementation. For example, for the "any key implementation" discussed above, an answering signal may be provided by double clicking any key of the keypad if there is no designated deactivation input key. For the "designated key implementation", an incoming call may be answered by clicking an undesignated key. After answering, communication (72) between the calling and called telephone continues as normal until a hang up input signal is received (74), and the call is terminated (76). If no answer is received within a predetermined time, the call may be terminated or forwarded to voicemail where available. Skuch voice mail service may be provided as a network service and/or embodied in customer premise equipment. In either event, appropriate call processing logic is used to monitor answering status, determine whether the predetermined time has aelapsed, and forward the call to voicemail as appropriate.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A telephone for use in a telecommunications network, said telephone comprising:

a receiver, for receiving an incoming call signal originated by a calling telephone, said incoming call signal including a call request to establish communication between said calling telephone and said called telephone using said telecommunications network;

answering input means for providing an answering signal in response to an answering input by said user;

call indicator means for providing an indication perceptible by a user, notifying said user of an incoming call signal;

said call indicator means being active in a first mode of operation, during an answering time period between receipt of said incoming call signal and receipt of said answering signal;

an incoming call processor for receiving said incoming call signal and processing said call request during said answering time period; and a call indicator controller for deactivating said call indicator means during at least a portion of said answering time period and allowing said incoming call processor to process said call request during said portion of said answering time period, said call indicator controller, comprising:

means for receiving a deactivation input entered selectively through a keypad, menu, or voice either during the answering time period or prior to said answering time period, wherein receipt of the deactivation input prior to the answering time period initiates a second mode of operation upon receipt of the incoming call signal, where a minimized call indication is provided during the answering time period; and means for controlling operation of said call indicator means in response to said deactivation input so as to terminate said first mode of operation of said call indicator means relative to said portion of said answering time period, wherein said incoming call processor is allowed to process said call request during said portion of said answering time period.

2. A system as set forth in claim 1, wherein said receiver comprises an antenna for receiving an RF signal.

3. A system as set forth in claim 1, wherein said receiver comprises a processing component for receiving a call request transmitted by one of a wireless and wireline network.

4. A system as set forth in claim 1, wherein said answering input means comprises a keypad.

5. A system as set forth in claim 1, wherein said answering input means comprises a processing component for receiving a user input indicating that the user desires to respond to said call request.

6. A system as set forth in claim 1, wherein said call indicator means comprises a ringer.

7. A system as set forth in claim 1, wherein said incoming call processor comprises means for monitoring user inputs to identify a call answer input.

8. A system as set forth in claim 1, wherein said call indicator controller comprises means for receiving said deactivation input prior to said answering time period and controlling operation of said call indicator means by implementing a second mode of operation wherein a minimized call indication is provided during the answering time period.

9. A system as set forth in claim 1, wherein said call indicator controller comprises means for receiving said deactivation input during said answering time period and substantially immediately deactivating said call indicator means.

10. A system as set forth in claim 1, further comprising messaging means, operatively associated with said call indicator controller, for providing a message during said portion of said answering time period.

11. A system as set forth in claim 10, wherein said messaging means comprises a memory for storing said message and a processing component for retrieving and transmitting said message.

12. A telephone for use in a telecommunications network, said telephone comprising:

a receiver for receiving an incoming call signal originated by a calling telephone, said incoming call signal including a call request to establish communication between said calling telephone and said called telephone using said telecommunications network;

an answering input means for providing an answering signal in response to an answering input entered selectively through a keypad, menu, or voices by said user, wherein said answering input is providable by said user either prior to receiving the incoming call or during receipt of the incoming call;

an incoming call processor for receiving said incoming call signal and processing said call request during answering time period in accordance with said answering input; and messaging means, operatively associated with said incoming call processor, for providing a message during said answering time period, said messaging means including:

messaging input means, for receiving a user, messaging input during said answering time period; and transmitting means for transmitting said message to said calling telephone in response to said user messaging input.

13. A system as set forth in claim 12, wherein said messaging means further comprises a memory for storing said message and a processing component retrieving said message from memory.

14. A method of operation for a telephone in a telecommunications network, comprising the steps of:

receiving an incoming call signal including a call request to establish communication between a calling telephone and a called telephone;

receiving an answering input from a user, wherein said answering input is providable by the user prior to receipt of the incoming call or in response to said call request;

activating a first call indicator during a first portion of a call answering time period between receipt of said incoming call signal and receipt of said answering input when said answering input is received during the incoming call;

activating a second call indicator when the answering input from the user is received prior to receipt of the user input receiving a deactivation input entered selectively through a keypad, menu, or voice, from said user; and deactivating the first call indicator, in response to said deactivation input, during a second portion of said answering time period.

15. A system as set forth in claim 14, wherein said deactivation input is received before said incoming call signal and said method further comprises the step of storing information as response to receipt of said deactivation input.

16. A system as set forth in claim 14, wherein said deactivation input is received during said call answering time period.

17. A system as set forth in claim 14, further comprising the steps of storing a message and transmitting said message to said calling telephone during said second time period.

\* \* \* \* \*

UNITED STATES PATENT AND TRADEMARK OFFICE
CERTIFICATE OF CORRECTION

PATENT NO. : 6,456,696 B1
DATED : September 24, 2002
INVENTOR(S) : Fargano et al.

It is certified that error appears in the above-identified patent and that said Letters Patent is hereby corrected as shown below:

Column 9,
Line 29, delete the word "voices", and insert therefor -- voice, --;

Column 10,
Line 19, after the word "input", insert therefor -- , --.

Signed and Sealed this

Eleventh Day of February, 2003

JAMES E. ROGAN
*Director of the United States Patent and Trademark Office*